United States Patent Office 3,746,731
Patented July 17, 1973

3,746,731
PROCESS FOR REFINING GLYCERIDE OILS AND FATS
Esmond J. Keating, New Orleans, La., assignor to the United States of America as represented by the Secretary of Agriculture
No Drawing. Filed Dec. 31, 1969, Ser. No. 889,715
Int. Cl. C09f 5/02
U.S. Cl. 260—426                                     8 Claims

ABSTRACT OF THE DISCLOSURE

This invention relates to the purification of crude glyceride oils or fats usually with alkaline reagents for the purpose of clarifying and conditioning the oils or fats for various end uses, usually edible products. The process is commonly known as "refining."

---

A non-exclusive, irrevocable, royalty-free license in the invention herein described, throughout the world for all purposes of the United States Government, with the power to grant sublicenses for such purposes, is hereby granted to the Government of the United States of America.

Numerous methods or processes are known in the art of refining, such as, the open kettle, continuous caustic soda, modified continuous soda ash, volatile alkali, and miscella refining. All of these methods are the subject matter of numerous patents and have as their major objective increased yields of refined oil containing more neutral oil and less impurities, such as free fatty acids, pigments, and unsaponifiables.

The prime object of the instant invention is, likewise, the production of excellent yields of refined oil containing greater amounts of neutral oil and less impurities but in a manner that is much simpler and much more economical. Further objects and advantages will become apparent in the description of the process.

The instant process is based primarily upon extraction of oilseeds with a mixed solvent composed of acetone, hexane, and water as typified by the patent to King and Frampton, U.S. Pat. No. 2,950,198, but extends to oil-solvent miscellas obtained by extraction with a wide variety of acetone-hexane-water compositions, such as 39/60/1, 50/48/2, and 57/39/4, all parts by weight respectively, or obtained by addition of acetone and water to hexane-oil miscellas, addition of hexane and water to acetone-oil miscellas, or addition of acetone and hexane and water to crude oil obtained by mechanical pressing. These are saturated mixtures with respect to water, that is, when represented by a ternary diagram, they all lie on the boundary line between the homogeneous and non-homogeneous areas and any addition of water will change the composition to a nonhomogeneous mixture of two phases. Therefore, when the homogeneous miscella is mixed with the aqueous alkali the additional water changes the composition to a nonhomogeneous two-phase system, etc. A typical ternary diagram is disclosed in the article by Treybal et al., Ind. and Eng. Chem., 41, 1761–63 (1949).

The miscellas thusly obtained or after concentrating are then refined simply and efficiently by mixing with suitable alkali in aqueous solution, such as soda ash, caustic soda, etc., in sufficient stoichiometric amount plus a suitable excess of alkali solution to neutralize the acidic substances and adsorb color bodies therein. Then passing the resulting mixture of refined oil-in-solvent and liquid soapstock to a suitable separating device, such as a settling tank or a centrifuge and subsequently recovering the refined oil by conventional means.

The stoichiometric amount of pure alkali required depends upon the amount of acidic substances in the miscella and is preferably added as a dilute aqueous solution containing from about 2 to 20 parts by weight of alkali, in the case of caustic soda, per 100 parts by weight of alkali, solution. The excess amount of alkali, which is necessary to reduce the color of the refined oil to acceptable levels, is preferably added as a percentage of the stoichiometric amount of alkali required, in amounts of from 30% to 100% depending upon the composition of the solvent used for extraction of the original oil bearing material as will be gleaned from subsequent examples, although it may be added on the basis of parts of pure alkali per 100 parts of oil present. The aforementioned alkali solution is added to miscellas, which may range in concentration from about 20% to 65% by weight of non-volatile substance, based upon the total weight of miscella, in a suitable container equipped with an agitator for batch processes or immediately preceding a pipe line mixer or conventional centrifugal pump equipped with a recirculation line for continuous processes. The amount of agitation required for the neutralization is not excessive being characterized as follows: For batch processes, the vessel depth to diameter ratio should range from about 1.5 to 4.5 to 1; the vessel diameter to agitator impeller diameter or length ratio about 3 to 1; the impeller diameter or length to width from about 3:1 to about 8:1; and the impeller tip or peripheral speed of from about 8 to 35 inches per second, the relative velocity, of the tip to the liquid being substantially less than this due to spinning of the liquid. For continuous processes the equipment should consist of two or more feed tanks, for miscella and for alkali solution, connected by suitable conduits to a pipe line mixer or conventional centrifugal pump.

Flow rate indicating devices and regulating valves or a conventional proportioning device should be situated in the conduits from the tanks to the pump-mixer. The miscella and caustic soda solution may be conveyed from the tanks to the mixer by pumps or gravity flow. The mixer or centrifugal pump should be equipped with a recirculation pipe from the discharge opening to the suction opening of a diameter such that the velocity therein is maintained at 7 to 10 feet per second, and a length such that the ratio of the volume of the pipe plus the volume of the pump to the input volume rate of miscella and alkali solution is in the order of from about ⅓ to 1, to about 3 to 1. The mixer or pump should have a positive pumping capacity of from about 10 to 50 times the throughput rate of the miscella and alkali solution. The miscella and alkali solution are preferably introduced into the recirculation pipe immediately adjacent to the suction opening of the pump/mixer and the discharge from the system is preferably placed immediately upstream from the said miscella and alkali inlet. The time required for the complete neutralization and color removal, including that required for adding the alkali solution ranges from about 0.5 to 5 minutes depending upon the concentration of the miscella and the concentration and amount of excess of the alkali solution and also upon whether a batch or continuous operation is being used. Immediately following the rapid neutralization of the acidic substances in the crude miscella it is preferable to separate the refined oil-in-solvent from the soapstock phase, either by normal gravity or centrifugal means and subsequently remove the solvent from the refined oil and soapstock by conventional means.

The simplicity, economy, and efficiency of the subject process will be readily apparent by comparing it with processes practiced in the art. For example, the advantages of refining in the miscella state are well known. The viscous nature of the oil is reduced to near water-like consistency, and the specific gravity difference between oil and soapstock phases is increased when dissolved in a miscible solvent. These advantages have already been pointed out by patents to Mattikow, No. 2,516,957, Cavanagh, No. 2,789,120, Vaccarino et al., No. 2,944,072, King et al., No. 3,025,314, and others. All of these processes, however, require relatively longer times, elaborate or special equipment, larger volumes of liquids, etc.

For example, Vaccarino et al., Pat. No. 2,944,072, proposes the use of a solvent for the oil which is miscible in all proportions with both oil and water, so that the neutralization takes place in a homogenous phase. On the contrary, the instant process proposes that the refining results are equally as good, if not better, but simpler and more economical, when carried out in a heterogeneous phase, since oil and water are not miscible in all proportions in the mixture of acetone and hexane proposed. The instant invention is simpler because large volumes of additional water are not required after neutralization and before separation of the two phases and indeed it is detrimental to the principles of miscella refining to remove most of the solvent from the oil phase before separation because it decreases the difference of specific gravity between the oil and the soapstock phases and increases the viscosity of the oil phase, both of which introduce problems in the separation step of the process. The instant process is also more economical because the introduction of large volumes of water before separation require greater investments in equipment, such as tanks, pumps, centrifuges, etc., to handle the larger volumes.

As a further comparison, the patent to King et al., No. 3,025,314, proposes the use of large volumes of hexane and/or water before the neutralization to remove acetone and produce an hexane miscella refinable by usual commercial procedures. Here again, simplicity and economy are thwarted by the addition of these excess volumes of liquid and the time-consuming period required to break emulsions. In addition, the resulting hexane miscella is subjected to the time consuming, complicated, high cost refining processes coincident therewith, which is typified by the patents to Cavanagh, Nos. 2,789,120; 2,824,885; 2,872,466; and 2,934,431 and other patents cited by him. For example, in Pat. No. 2,789,120, the use of vigorous mixing in an homogenizer is proposed. Said homogenizer operating at a pressure greater than 300 p.s.i. to achieve the desired results. However, Pat. No. 2,872,466 refers to the homogenizer as a source of a three-phase fluid system, which produces problems in separation, and proposes additional specialized costly and complicated equipment to reduce the three-phase system to a two-phase system. Also, Pat. No. 2,824,855 proposes an improved water washing process for the refined oil or miscella after the neutralization and separation steps, for the purpose of reducing the soap content of the refined oil. Emulsions and three-phase systems are not encountered in the instant invention and water washing is unnecessary. However, for some end uses of the oil, such as hydrogenation, polishing filtration may be necessary and this may be accomplished in the refined miscella state simply by the use of a filter aid, either dispersed in the miscella or coated on the filter medium. Indeed it is preferable to carry out the filtration in the miscella state because the lower viscosity gives higher filtration rates, and also any oil trapped in the filter aid and medium may be easily washed therefrom by a small portion of a nonsolvent for the soap, such as hexane, which is miscible with the refined miscella and recoverable in the subsequent solvent stripping operation and reusable in the extraction step.

The following examples will serve to illustrate the details of the invention.

EXAMPLE 1

Suitably prepared cottonseed kernels were extracted with a mixed solvent composed of 39 parts of acetone, 60 parts of hexane, and 1 part of water, all on a weight basis. The resulting miscella contained 66 parts by weight of the mixed solvent and 34 parts of nonvolatile material, such as oil, free fatty acids, gossypol, phosphatides, gums, pigments, and other impurities of which 6.4% by weight (based on oleic acid) reacted stoichiometrically with sodium hydroxide and 90.3% was neutral oil. Sixty (60) parts by weight of this miscella was reacted with the stoichiometric amount of caustic soda dissolved in water to a concentration of 5.0% by weight, plus an additional amount of this caustic solution equal to 50% of the stoichiometric amount. The reaction was carried out in a vessel equipped with a paddle-type mixer, having 3 paddles equally spaced on the shaft, said paddles having a ratio of length to width of about 3 to 1 and turning at a speed such that the tip velocity of the paddles was approximately 8 feet per second. The vessel had a depth to diameter ratio of about 4:1 and the vessel diameter to paddle length ratio was approximately 3:1. The total time for the neutralization, including that required to add the caustic soda solution, was 2 minutes. Immediately after, the mixture was separated by centrifugation into a refined oil-solvent phase and a liquid soapstock phase. Analysis of the refined oil phase showed a yield of 91.12% refined oil based on the nonvolatiles in the original miscella and a neutral oil content of 99.73%. The lovibond color of the refined oil was 3.4 Red and the bleached color was 2.4 Red.

EXAMPLE 2

An equal quantity of the cotton seed oil miscella used in Example 1 was refined in the same manner, using the same equipment for the same period of time and the same 5% caustic soda to solution but with an excess of caustic solution of 30%. Analysis of the refined oil phase showed a yield of refined oil of 91.05% having a color of 5 Red.

EXAMPLE 3

The same process as described in Example 1 but using 7.5% caustic soda solution with a 50% excess, yielded 91.21% refined oil containing 99.77% neutral oil and a color of 4.2 Red.

EXAMPLE 4

The same process as described in Example 1 but using 7.5% caustic solution with a 30% excess, yielded 90.75% refined oil containing 99.84% neutral oil and a color of 4.8 Red.

EXAMPLE 5

The same process as described in Example 1 but using 10% caustic solution with a 50% excess yielded 91.30% refined oil containing 99.17% neutral oil and color of 5.8 Red.

EXAMPLE 6

The same process as Example 1 but using 20% caustic solution with a 50% excess yielded 90.84% refined oil with a color of 6.2 Red and a neutral oil content of 99.43%.

EXAMPLE 7

Suitably prepared cottonseed kernels were extracted with a mixed solvent composed of 57 parts of acetone, 39 parts of hexane, and 4 parts of water, all on a weight basis. The miscella obtained contained 74 parts by weight of the mixed solvent and 26 parts of nonvolatile material, of which 7.0% based on oleic acid reacted stoichiometrically with caustic soda and 89.0% was neutral oil. A quantity of this miscella equal to that used in Example 1 was refined in the same vessel for the same period of time using the required amount of 7.5% caustic soda solution plus an additional amount of caustic solution equal to 100% of the stoichiometric amount. After separation by centrifugation, analysis of the refined oil phase showed a yield of refined oil of 88.30%, of which 98.92% was neutral oil. The lovibond color was 7.0 Red. Also, extraction of the soapstock phase with hexane, showed a refined oil content of 1.52% by weight.

EXAMPLE 8

Cottonseed oil miscella obtained as in Example 1, with the same solvent mixture, was concentrated in a rising film evaporator under a vacuum of 15 to 18 inches of Hg to a concentrated miscella containing 46 parts by weight of solvent and 54 parts by weight of nonvolatile material, of which 6.1%, based on oleic acid, reacted stoichiometrically with sodium hydroxide. Twenty (20) parts by weight of this concentrated miscella was reacted with the stoichiometric quantity of sodium hydroxide dissolved in water to a concentration of 20% by weight, plus an excess equal to 50% of the stoichiometric amount. The reaction was carried out in a vessel equipped with a top mounted, air powered mixer, having a shaft with a single cavitating type of impeller of which the diameter to thickness ratio was about 8 to 1, and turning at a speed such that the peripheral velocity was about 35 ft. per second. The vessel had a depth to diameter ratio of approximately 1.5 to 1 and the vessel diameter to impeller diameter was approximately 3 to 1. The total time for the neutralization including that required to add the caustic soda solution was 5 minutes. The mixture was subsequently separated by centrifugation and the refined oil phase stripped of solvent in a conventional manner. The lovibond color of the refined oil was 7.0 Red.

EXAMPLE 9

Cottonseed oil miscella obtained as in Example 1 with the same solvent mixture but containing 78.5 parts by weight of solvent and 21.5 parts by weight of nonvolatile material, of which 5.5% by weight based on oleic acid reacted stoichiometrically with sodium hydroxide was neutralized in a continuous manner in the equipment previously described. The miscella was reacted with the stoichiometric amount of caustic soda solution at a concentration of 2.5% by weight, plus an excess of this solution equal to 50% of the theoretical amount. The miscella and caustic solution were introduced into the pump-mixer system at a rate that gave an average residence time in the system of 0.6 minute. The overflow from the system was collected in a vessel and the soapstock allowed to settle by gravity. The decanted, refined miscella was filtered through a filter medium coated with filter aid. The solvent was removed from the oil in a conventional manner. Analysis of the refined oil showed a soap content of 20 parts per million and a color of 9.1 Red.

EXAMPLE 10

Cottonseed oil miscella obtained as in Example 1 with the same solvent mixture was partially desolventized in a rising film evaporator to a concentration of 35 parts by weight of solvent and 65 parts by weight of nonvolatile material, of which 4.00% reacted stoichiometrically with sodium hydroxide and was neutralized in the continuous equipment previously described. The miscella was reacted with 1.5 times the stoichiometric amount of 10% by weight caustic soda solution. The feed rate was such that the average residence time in the mixer system was about 1 minute. The discharge from the system was separated by continuous centrifugation, filtered with a cellulosic type filter aid and stripped of solvent by conventional means. The lovibond color was 5.8 Red.

I claim:
1. A process for purifying the glyceride oil obtained from an oilseed, comprising:
   (a) extracting the oilseed with a homogeneous mixture consisting of acetone, hexane, and water, said mixture being saturated with respect to the water and when represented by a ternary diagram lies on the boundary line between the homogeneous and nonhomogeneous areas and any addition of water thereto will change the composition to a nonhomogeneous mixture of two phases;
   (b) refining the resulting miscella from step (a) by mixing therewith a slight excess of the stoichiometric amount of an aqueous alkali solution to neutralize impurities and to produce a two-phase system consisting of a refined oil-solvent phase and a liquid soapstock phase;
   (c) separating the refined oil-solvent phase from the liquid soapstock phase; and
   (d) removing the solvent from the refined oil-solvent phase to obtain the refined oil.
2. The process of claim 1 wherein the homogeneous mixture consists of acetone, hexane, and water in the ratio of 39:60:1, respectively, in parts by weight.
3. The process of claim 1 wherein the homogeneous mixture consists of acetone, hexane, and water in the ratio of 50:48:2, respectively, in parts by weight.
4. The process of claim 1 wherein the homogenous mixture consists of acetone, hexane, and water in the ratio of 57:39:4, respectively, in parts by weight.
5. The process of claim 1 wherein the oilseed is cottonseed.
6. A process for purifying the glyceride oil obtained from an oilseed, comprising:
   (a) expressing the oilseed to obtain the crude oil;
   (b) mixing the crude oil from step (a) with a homogeneous mixture consisting of acetone, hexane, and water, said mixture being saturated with respect to the water and when represented to a ternary diagram lies on the boundary line between the homogeneous and nonhomogeneous area and any addition of water thereto will change the composition to a nonhomogeneous mixture of two phases;
   (c) refining the resulting miscella from step (b) by mixing therewith a slight excess of the stoichiometric amount of an aqueous alkali solution to neutralize impurities and to produce a two-phase system consisting of a refined oil-solvent phase and a liquid soapstock phase;
   (d) separating the refined oil-solvent phase from the liquid soapstock phase; and
   (e) removing the solvent from the refined oil-solvent phase to obtain the refined oil.
7. A process for purifying the glyceride oil obtained from an oilseed, comprising:
   (a) extracting the oilseed with acetone;
   (b) mixing with the resulting oil extract from step (a) sufficient hexane and water to form a homogeneous miscella comprising the oil and a mixture of solvents consisting of acetone, hexane, and water, said mixture of solvents being saturated with respect to the water and when represented by a ternary diagram lies on the boundary line between the homogeneous and nonhomogeneous areas and any addition of water thereto will change the composition to a nonhomogeneous mixture of two phases;
   (c) refining the miscella of step (b) by mixing therewith a slight excess of the stoichiometric amount of an aqueous alkali solution to neutralize impurities and to produce a two-phase system consisting of a refined oil-solvent phase and a liquid soapstock phase;
   (d) separating the refined oil-solvent phase from the liquid soapstock phase; and
   (e) removing the solvent from the refined oil-solvent phase to obtain the refined oil.
8. A process for purifying the glyceride oil obtained from an oilseed, comprising:
   (a) extracting the oilseed with hexane;
   (b) mixing with the resulting oil extract from step (a) sufficient acetone and water to form a homogeneous miscella comprising the oil and a mixture of solvents consisting of acetone, hexane, and water, said mixture of solvents being saturated with respect to the water and when represented by a ternary diagram lies on the boundary line between the homogeneous and nonhomogeneous areas and any addition of water thereto will change the composition to a nonhomogeneous mixture of two phases;

(c) refining the miscella of step (b) by mixing therewith a slight excess of the stoichiometric amount of an aqueous alkali to neutralize impurities and to produce a two-phase system consisting of a refined oil-solvent phase and a liquid soapstock phase;

(d) separating the refined oil-solvent phase from the liquid soapstock phase; and (e) removing the solvent from the refined oil-solvent phase to obtain the refined oil.

References Cited

UNITED STATES PATENTS 3,025,314   3/1962   King et al. _____ 260—426 X

LEWIS GOTTS, Primary Examiner

E. G. LOVE, Assistant Examiner

U.S. Cl. X.R.

260—412.4